(12) United States Patent
Zhang et al.

(10) Patent No.: US 11,455,309 B2
(45) Date of Patent: Sep. 27, 2022

(54) PARTITION KEY ADJUSTMENT BASED ON QUERY WORKLOAD

(71) Applicant: International Business Machines Corporation, Armonk, NY (US)

(72) Inventors: Hong Mei Zhang, Beijing (CN); Shuo Li, Beijing (CN); Xiaobo Wang, Beijing (CN); ShengYan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 16/926,831

(22) Filed: Jul. 13, 2020

(65) Prior Publication Data
US 2022/0012245 A1    Jan. 13, 2022

(51) Int. Cl.
*G06F 16/24* (2019.01)
*G06F 16/2455* (2019.01)
*G06F 16/2453* (2019.01)
*G06F 16/23* (2019.01)
*G06F 16/248* (2019.01)
*G06F 16/22* (2019.01)

(52) U.S. Cl.
CPC .... *G06F 16/24554* (2019.01); *G06F 16/2282* (2019.01); *G06F 16/23* (2019.01); *G06F 16/248* (2019.01); *G06F 16/24539* (2019.01)

(58) Field of Classification Search
CPC .............................................. G06F 16/24554
USPC .......................................................... 707/713
See application file for complete search history.

(56) References Cited

U.S. PATENT DOCUMENTS

| | | | |
|---|---|---|---|
| 7,472,107 B2 | 12/2008 | Agrawal et al. | |
| 10,223,437 B2 | 3/2019 | Klots et al. | |
| 2004/0122845 A1 | 6/2004 | Lohman et al. | |
| 2010/0281013 A1* | 11/2010 | Graefe | G06F 16/2246 |
| | | | 707/715 |
| 2016/0378826 A1* | 12/2016 | Bensberg | G06F 16/24552 |
| | | | 707/721 |
| 2019/0102553 A1* | 4/2019 | Herwadkar | G06F 21/566 |
| 2020/0026695 A1 | 1/2020 | Yan et al. | |

(Continued)

OTHER PUBLICATIONS

Papadomanolakis et al., "AutoPart: Automating Schema Design for Large Scientific Databases Using Data Partitioning", Proceedings of the 16th International Conference on Scientific and Statistical Database Management (SSDBM'04), Publication Date: Jul. 19, 2004, 10 pages.

(Continued)

*Primary Examiner* — Syling Yen
(74) *Attorney, Agent, or Firm* — Daniel M. Yeates

(57) ABSTRACT

Disclosed is a computer-implemented method to adjust partition keys. The method includes identifying a target table that is a target of a query, the target table including a set of initial partitions. The method also includes determining a set of common queries, wherein each of the common queries are configured to retrieve data from the target table. The method further includes identifying a plurality of core ranges. The method includes merging the core ranges into a new set of partitions. The method further includes setting, in response to the merging, updated partition keys. Further aspects of the present disclosure are directed to systems and computer program products containing functionality consistent with the method described above.

20 Claims, 7 Drawing Sheets

(56) References Cited

U.S. PATENT DOCUMENTS

2021/0109930 A1* 4/2021 Petride ................ G06F 16/2393
2021/0117232 A1* 4/2021 Sriharsha .............. G06F 9/3891

OTHER PUBLICATIONS

"Horizontal, vertical, and functional data partitioning", Microsoft Azure, Nov. 4, 2018, 12 pages. https://docs.microsoft.com/en-us/azure/architecture/best-practices/data-partitioning.
Mell et al., "The NIST Definition of Cloud Computing", Recommendations of the National Institute of Standards and Technology, Special Publication 800-145, Sep. 2011, 7 pages.

* cited by examiner

| Query # | Range Low | Range High | Frequency (per week) | Time (Ave, Min) | Weight |
|---|---|---|---|---|---|
| 1 | A | E | 800 | 2.0 | 0.4 |
| 2 | B | D | 200 | 0.5 | 0.1 |
| 3 | C | G | 400 | 1.5 | 0.2 |
| 4 | F | H | 600 | 0.3 | 0.3 |

FIG. 7A

| Core Range | Low Value Core Range | | | High Value Core Range | | | Records |
|---|---|---|---|---|---|---|---|
| | Value | Weight | Direction | Value | Weight | Direction | |
| 1 | L | 0 | | A | 0.4 | Left | 1000 |
| 2 | A | 0.4 | Left | B | 0.1 | Left | 1500 |
| 3 | B | 0.1 | Left | C | 0.2 | Left | 3000 |
| 4 | C | 0.2 | Left | D | 0.1 | Right | 800 |
| 5 | D | 0.1 | Right | E | 0.4 | Right | 1800 |
| 6 | E | 0.4 | Right | F | 0.3 | Left | 1600 |
| 7 | F | 0.3 | Left | G | 0.2 | Right | 300 |
| 8 | G | 0.2 | Right | H | 0 | | 5000 |

FIG. 7B

| Physical Partition | Core Range | | | | | | | |
|---|---|---|---|---|---|---|---|---|
| | 1 | 2 | 3 | 4 | 5 | 6 | 7 | 8 |
| 1 | 1000 | 875 | | | | | | |
| 2 | | 625 | 1250 | | | | | |
| 3 | | | 1750 | 125 | | | | |
| 4 | | | | 675 | 1200 | | | |
| 5 | | | | | 600 | 1275 | | |
| 6 | | | | | | 325 | 300 | 1250 |
| 7 | | | | | | | | 1875 |
| 8 | | | | | | | | 1875 |

FIG. 7C

PARTITION KEY ADJUSTMENT BASED ON QUERY WORKLOAD

BACKGROUND

The present disclosure relates to database management, and, more specifically, increasing query efficiency by adjusting partition keys.

Modern database system can contain large amounts of data (e.g., gigabytes, terabytes, petabytes, etc.). The data is divided into tables and other various data structures, yet some tables can contain gigabytes of data or more. Partitioning tables in a database is a technique used to break a large table into smaller table segments, where each segment (or partition) can be treated as an individual table.

SUMMARY

Disclosed is a computer-implemented method to adjust partition keys. The method includes identifying a target table that is a target of a query, the target table including a set of initial partitions. The method also includes determining a set of common queries, wherein each of the common queries are configured to retrieve data from the target table. The method further includes identifying a plurality of core ranges. The method includes merging the core ranges into a new set of partitions. The method further includes setting, in response to the merging, updated partition keys. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIG. 7A is an example table showing common query data.

FIG. 7B is an example table showing core ranges.

FIG. 7C is an example table showing partition blocks.

DETAILED DESCRIPTION

Figure 1:
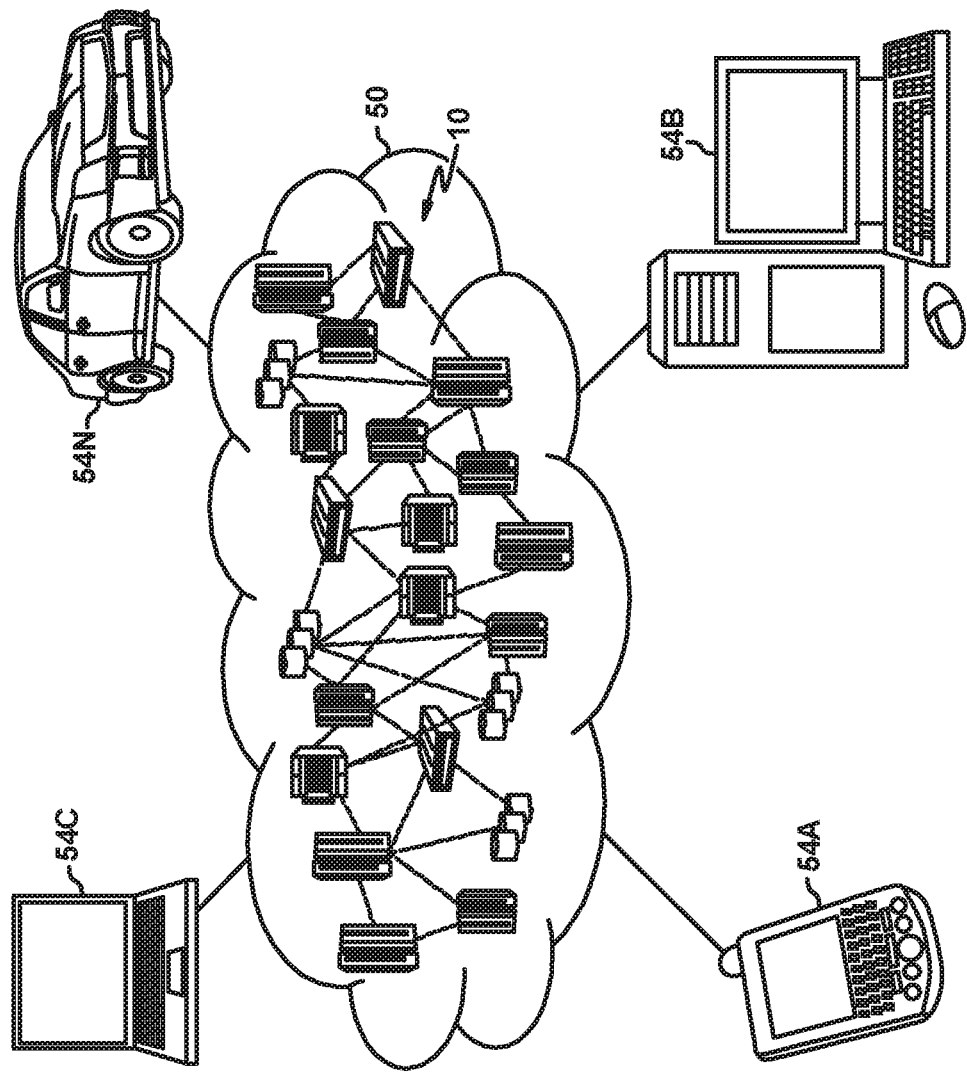
FIG. 1 depicts a cloud computing environment according to an embodiment of the present invention.

Modern database systems can contain large amounts of data (e.g., gigabytes, terabytes, petabytes, etc.). The data can be divided into tables and other data structures. Despite data being separated into different table, some tables can contain gigabytes of data or more. Partitioning tables is a technique used to break a large tables into smaller table segments, where each segment (or partition) can be treated as an individual table.

In order to increase the efficiency and effectiveness of processing queries, embodiments of the present disclosure may adjust partition keys to limit the amount of data scanned to process queries.

The following acronyms may be used below:
API application program interface
ARM advanced RISC machine
CD-compact disc ROM
ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
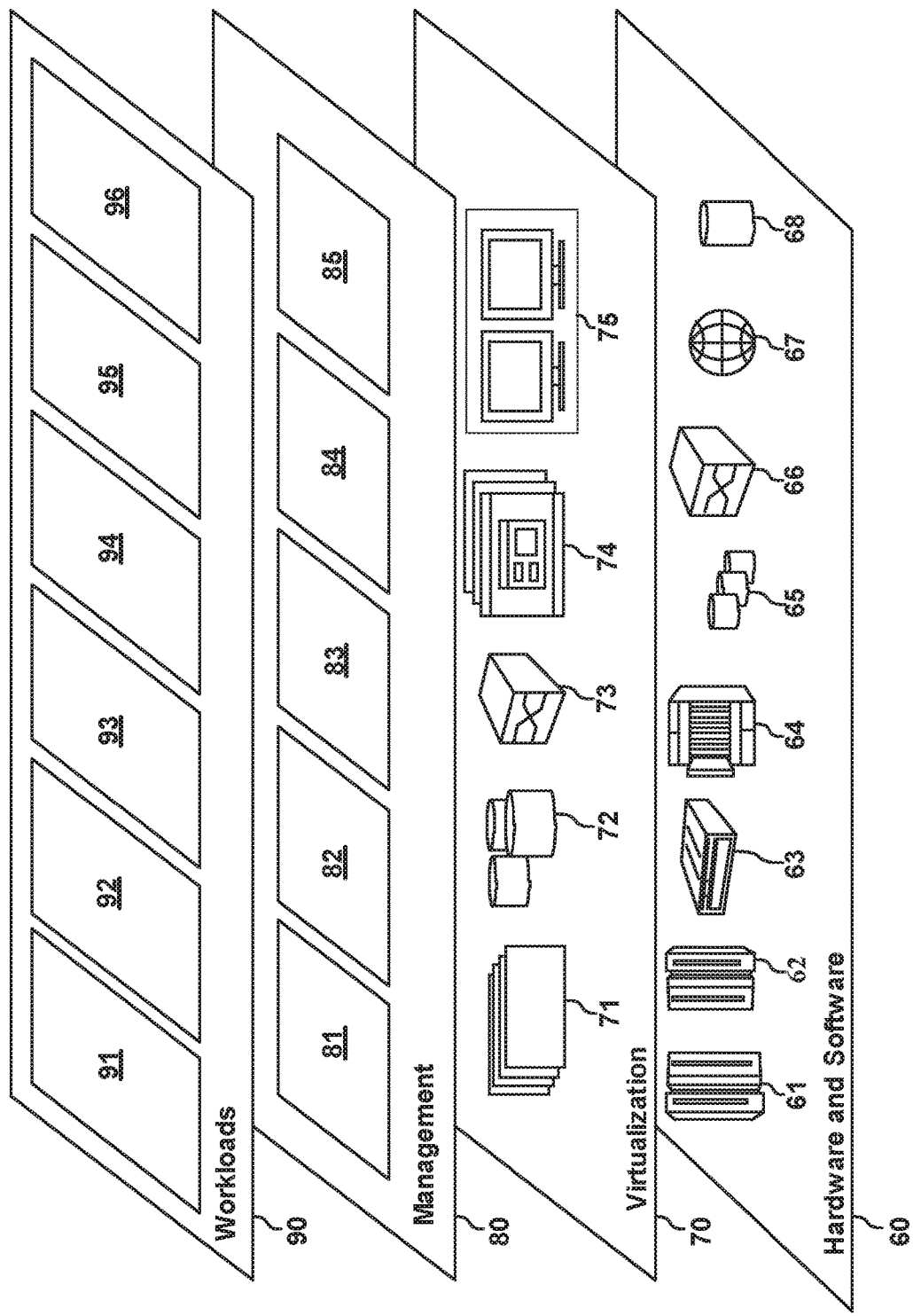
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
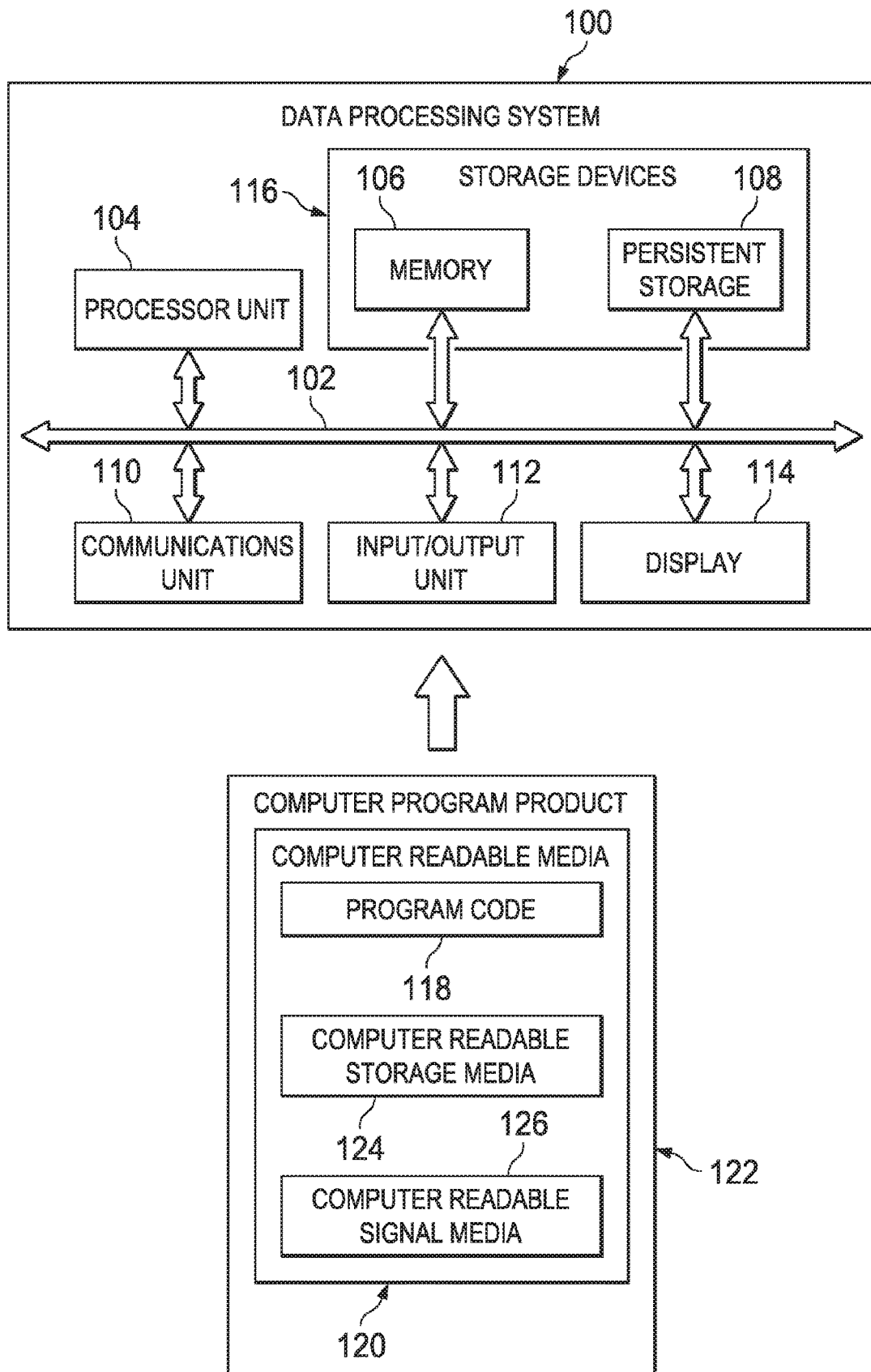
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Adjusting Partition Keys

Modern database systems can contain large amounts of data (e.g., gigabytes, terabytes, petabytes, etc.). The data is divided into tables and other various data structures, yet some tables can contain gigabytes of data or more. As the size of a table increases, the amount of computing resources needed to retrieve data from the table increases. When a query is configured to search the entire table, the database system may expend the resources to scan each entry in the table even if the data being queried is confined in a small portion of the overall table. The resources used to scan the remaining tablespace are essentially wasted.

One solution to the above issue is table partitioning. Partitioning tables in a database is a technique used to break a large table into smaller table segments, where each segment (or partition) can be treated as an individual table. Partition keys are used to indicate which sections of a table belong in which partitions. There are two common types of partitioning, range partitioning and list partitioning. Range partitioning sets partition keys based on data values. For example, if a table has a data set with values (or rows) that range from 1 to 1000, the partitions can be set every 250. One partition has values from 1 to 250, the second partition has values from 251 to 500, and so on. List partitioning defines a list of discrete values that are grouped into a partition. For example, if a data set includes a day of the week, the first partition can be any data that includes Monday, Wednesday, and Saturday; a second partition with Tuesday and Sunday; and a third partition with Thursday and Friday. Partition sizes can become uneven/unbalanced. One potential cause can be an uneven distribution of data.

Queries can be configured to scan only specific partitions of a table. However, if a query spans two or more partitions, then all of both partitions need to be scanned to retrieve the relevant values, even if the query only slightly extends into the second partition. For example, consider two partitions from values 0-100 and values 101 to 200. If a query is looking for values from 1 to 105, the entire second partition must be scanned even though no values above 105 will be returned. If this query is repeated multiple times a day, the inefficiency can be compounded Another cause of the partitions becoming unbalanced is new/added data. As data records are added, deleted, and/or manipulated from a table, this may cause one partition to increase in size relative to the other partitions in the table. If the larger partitions correspond with higher usage, this may still lead to inefficient utilization of computing resources. Continuing the above example, if additional entries are added between values 106 and 200 this can further increase the query time, or rather decrease the efficiency.

Embodiments of the present disclosure can adjust the partition keys based on query workload and table statistics to increase the efficiency of queries and the database system as a whole. Adjusting/updating the partition keys can improve query performance by reducing the scope of a particular scan. Additionally, as workloads change the keys can be further adjusted (or readjusted) to increase the efficiency of the new workload. For example, an update to an application can alter a common query that is used to search the database, such as entries in the last 12 months. In a new month, there may be additional data unnecessarily scanned based on the partition keys. Embodiments of the present disclosure can update the partition keys based on the new query (e.g., new month), or more generally, a change in the query workload.

Embodiments of the present disclosure include a partition manager configured to adjust/remap/update partition keys. In some embodiments, a partition manager identifies a target table. The target table can be a table included in a query received by a database system. In some embodiments, the partition manager identifies common queries. The common queries are all directed at the target table and may have a common predicate. Each common query includes a range. The range includes a low endpoint and a high endpoint. In some embodiments, the partition manager identifies core ranges. Core ranges can be each range from each endpoint of each common query. In some embodiments, the partition manager merges core ranges into partitions. Each partition can have a minimum and/or a maximum size. The merging can be based on a query weight. The query weight represents the relative importance in frequency and/or computing resources relative to the other common queries. In some embodiments, partition manager updates/remaps the partition keys. The updating can include dividing each core range into one or more blocks. The blocks can be mapped into the original partitions. Thus, when a common query is received, the amount of data that is scanned to complete the query is reduced to only the blocks of the relevant data.

The aforementioned advantages are example advantages, and embodiments exist that can contain all, some, or none of the aforementioned advantages while remaining within the spirit and scope of the present disclosure.

Figure 4:
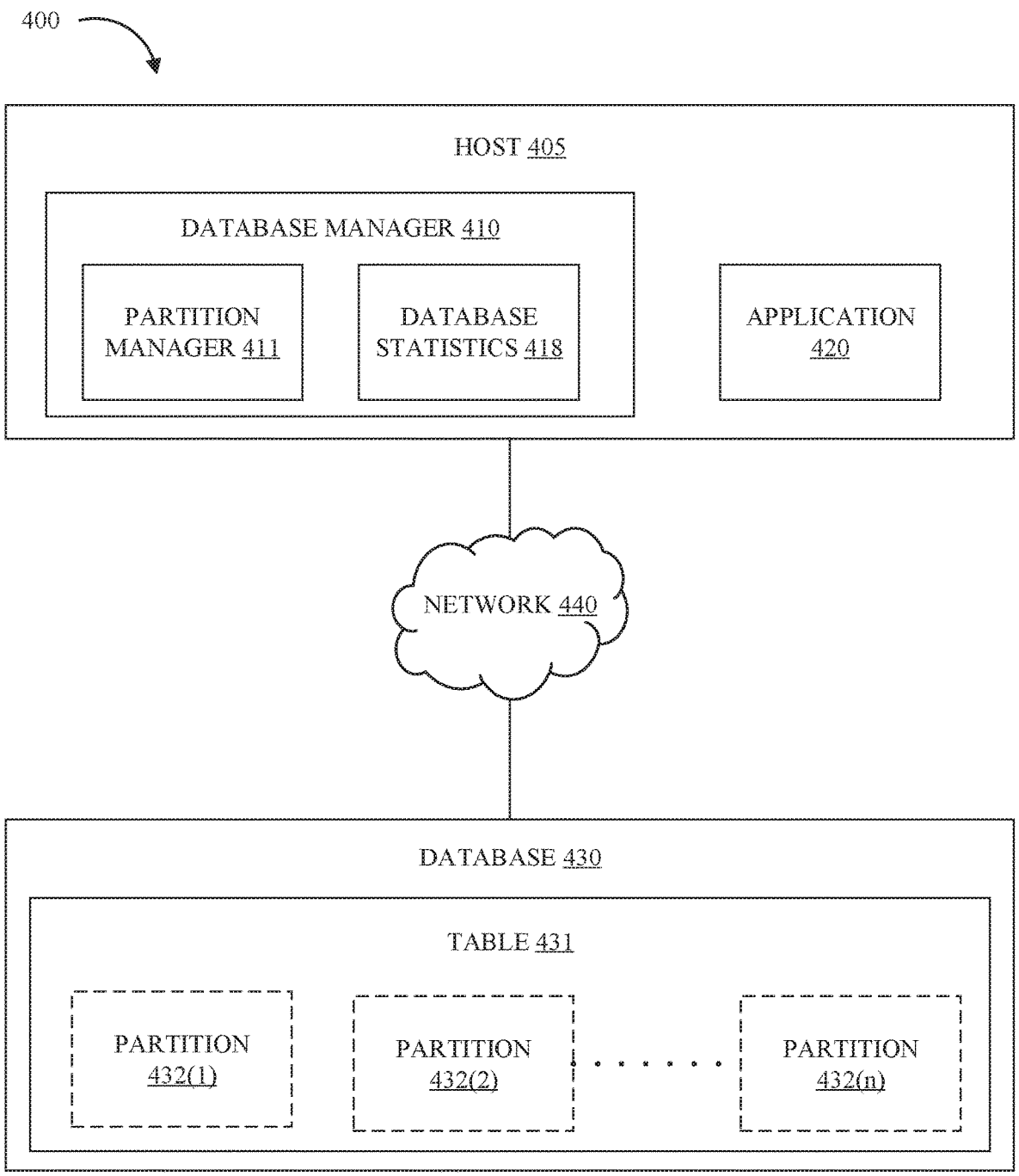
FIG. 4 illustrates a functional diagram of a computing environment suitable for operation of a partition manager in accordance with some embodiments of the present disclosure.

Referring now to various embodiments of the disclosure in more detail, FIG. 4 is a representation of a computing environment 400, that is capable of running a partition manager in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 405, database 430, and other computing devices (not shown) within computing environment 400. In some embodiments, host 405 and/or database 430 may include a computer system, such as the data processing system 100. In some embodiments, host 405 and database 430 are included in the same computing device, however, they are shown as separate for discussion purposes.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50. In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410, and application 420.

Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system (which can includes database 430). A federated database system can transparently map multiple autonomous database systems into a single federated (combined) database. In some embodiments, a federated database system acts as a virtual database, where there is no actual data integration in the constituent databases. In some embodiments, database manager 410 includes partition manager 411, and database statistics 418.

Partition manager 411 can be any combination of hardware and/or software configured to update partition keys. In some embodiments, partition manager 411 includes an updatable policy. The policy can include a number of partitions and how the number of partitions can change. For example, the policy can indicate how many partitions are in a table, and whether the number of partitions can increase and/or decrease based on the method 600 (FIG. 6) below. In some embodiments, the policy includes a minimum and maximum size of a partition, and/or how partition size can change.

Database statistics 418 can be any combination of hardware and/or software configured to store database statistics. In some embodiments, database statistics 418 tracks distribution of values in the tables and indexes in the database. In some embodiments, database statistics 418 is updated and maintained by database manager 410. In some embodiments, database statistics 418 includes frequency data. Frequency data represents the relative occurrence of a given value. In some embodiments, database statistics 418 includes histograms. Histograms may represent relative occurrences of a range of values.

In some embodiments, database statistics keeps a record of each query received. This can include the source of the query (e.g., application 420), the structure, the target data, and other similar data. In some embodiments, the common query includes data ranges queried, query efficiency, and/or query execution time. In some embodiments, queries can be organized/categorized according to a target table, a predicate (e.g., filter, target), and other similar factors.

Application 420 can be any combination of hardware and/or software that is configured to generate a query. A query can be a request for data and/or information stored in one or more tables of one or more databases. The databases may be local (e.g., on host 405), or remote (e.g., database 430). In some embodiments, application 420 sends the query to database manager 410. In some embodiments, application 420 is included in database manager 410.

In some embodiments, application 420 is part of a computing device separate from host 405. The computing device may communicate with host 405 via network 440. In some embodiments, the computing device can generate queries, send queries to host 405, and/or receive and display the results of the query. In some embodiments, application 420 can include (or be considered) two or more separate applications, wherein each application is configured to generate and send queries to database 430.

In some embodiments, the query is generated in Structured Query Language (SQL). In some embodiments, application 420 displays the results of the query. The results may be returned in an SQL format, and/or as images, graphs, trends, and/or other similar formats.

Database 430 can be any combination of hardware and/or software configured to store data in a database system. In some embodiments, database 430 is part of a federated database system. In some embodiments, database 430 includes two or more databases communicatively connected. In some embodiments, database 430 may be contained within host 405.

In some embodiments, database 430 includes table 431. In some embodiments, database 430 includes multiple tables and/or other various data structures. In some embodiments, table 431 is a frequent target of queries. In some embodiments, table 431 is separated into two or more partitions (e.g., partitions 432).

In some embodiments, table 431 includes partition 432(1), partition 432(2), through partition 432(n), where n is an integer index. Partitions 432(1) through 432(n) may be referred as partitions 432 in combination or representatively. Partitions 432 may include range partitions and/or list partitions. Each partition boundary is set by a partition key. The keys indicate starting/stopping or alternatively list which data belong in which partition. Partitions 432 can include the same and/or different amounts or data/number of records. Partition keys can be adjusted/updated. The adjustments can be based on a change in the data (e.g., addition/subtraction of data from the table), performance (e.g., execution time increases), periodically (e.g., weekly, etc.), and/or random.

Figure 5:
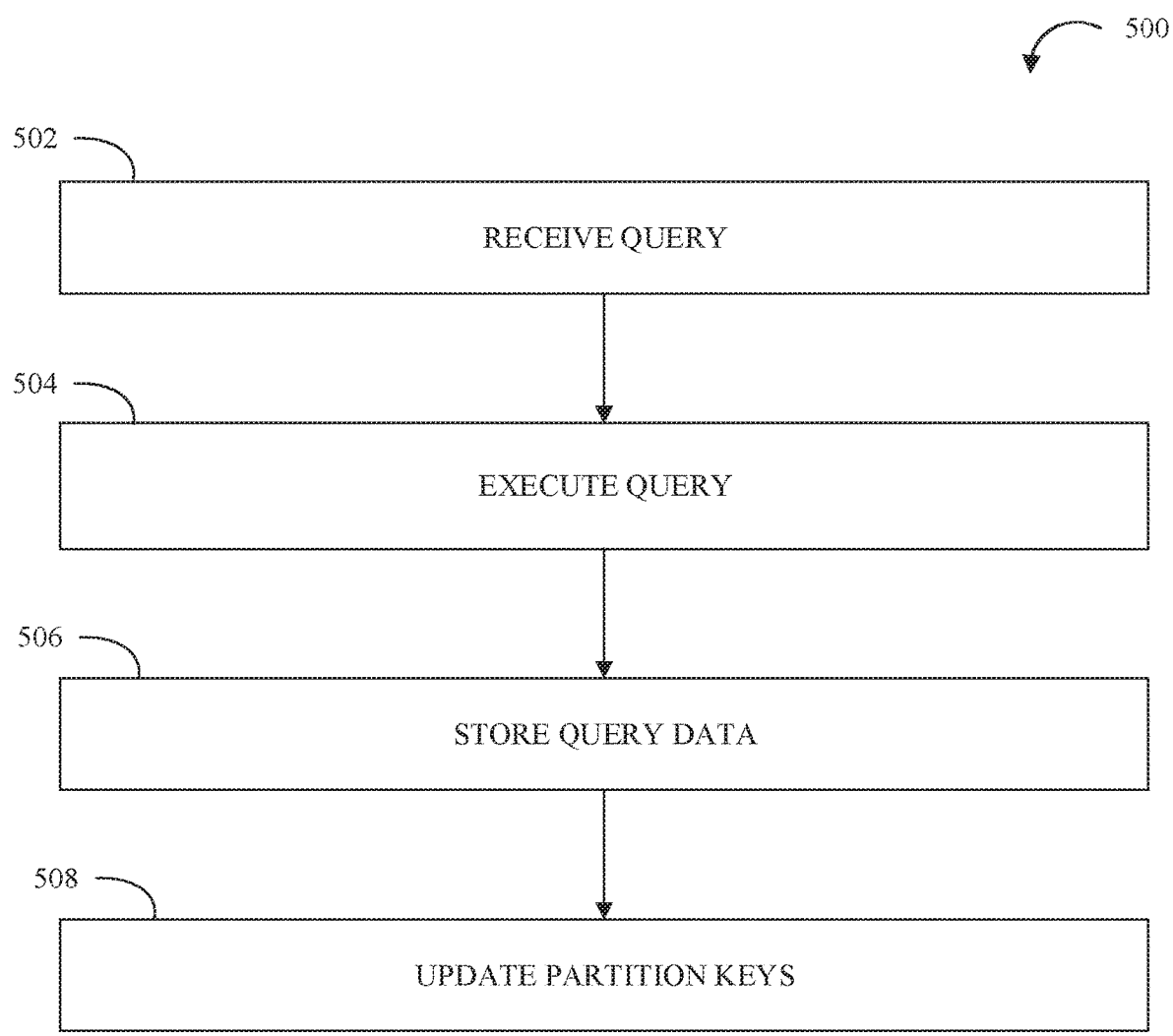
FIG. 5 illustrates a flow chart of an example method to update partition keys in accordance with some embodiments of the present disclosure.
Figure 6:
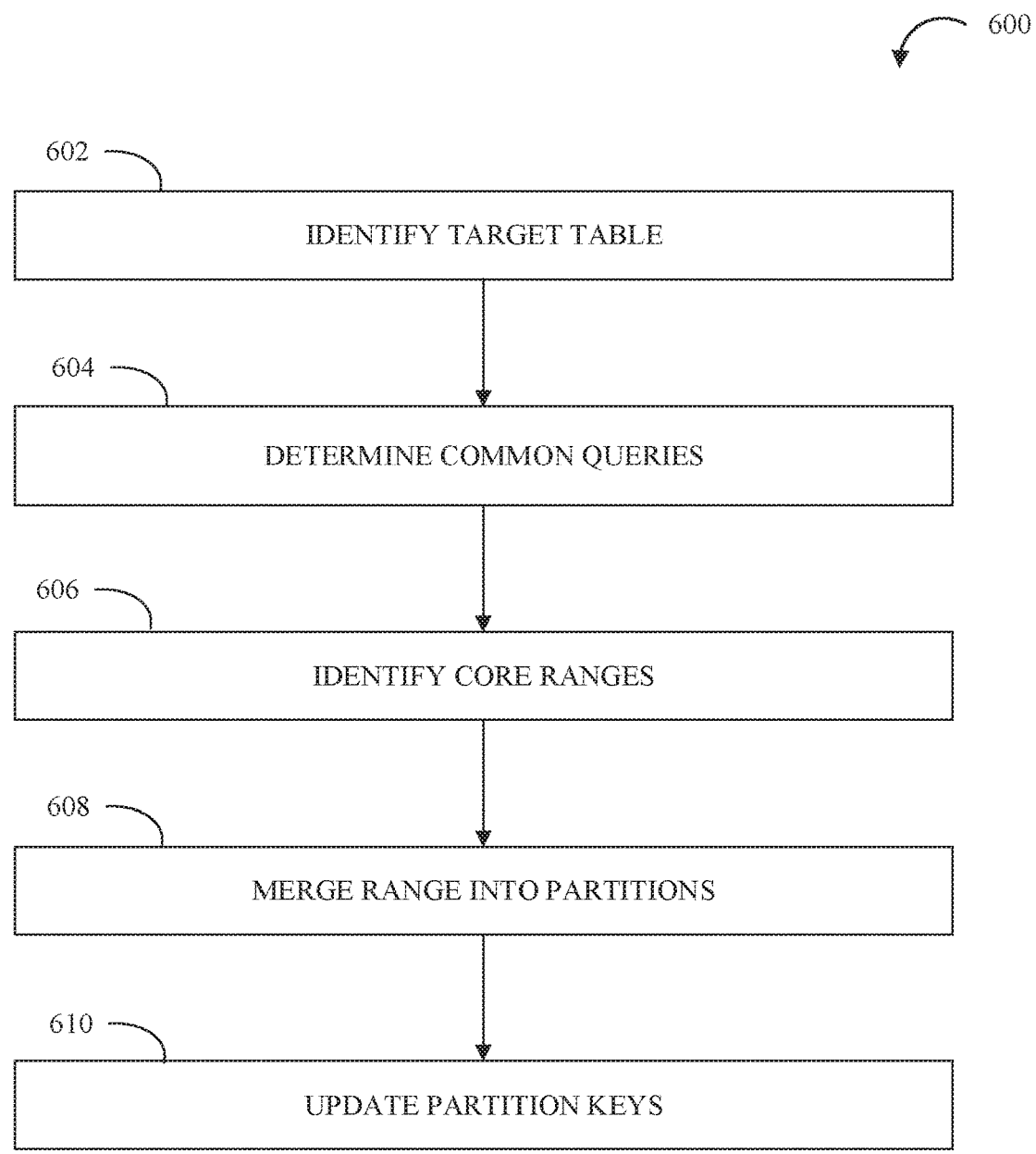
FIG. 6 illustrates a flow chart of an example method to update partition keys in accordance with some embodiments of the present disclosure.

FIGS. 5 and 6 depict parts of a flowchart of example methods, methods 500 and 600, for updating partition keys that can be performed in a computing environment (e.g., computing environment 400 and/or cloud computing environment 50). One or more of the advantages and improvements described above for generating updating partitions keys based on query workloads may be realized by methods 500 and 600, consistent with various embodiments of the present disclosure.

Method 500 can be implemented by one or more processors, host 405, database manager 410, database 430, and/or a different combination of hardware and/or software. In various embodiments, the various operations of method 500 are performed by one or more of host 405, database manager 410, and/or database 430. For illustrative purposes, the method 500 will be described as being performed by database manager 410.

At operation 502, database manager 410 receives a query. In some embodiments, the query is received from application 420. The query can be configured to retrieve data from a partitioned table (e.g., table 431). In some embodiments, the query is received in SQL. In some embodiments, the query is configured to perform one or more commands on a set of data, wherein the data is stored in database 430. In some embodiments, operation 502 includes parsing the query.

At operation 504 database manager 410 executes the query. In some embodiments, operation 504 can include generating/optimizing an access plan and/or returning the completed command to the requestor.

At operation 506 database manager 410 stores query data. In some embodiments, data from each query received by database manager 410 is stored. The data can be stored in database statistics 418. In some embodiments, the data is categorized/organized based on one or more factors. The factors can include the presence of a target table, query source, query scope, processing time, resource utilization, and/or other similar factors. For example, each query directed to a particular table can be grouped together. Those queries may be further grouped based on one or more predicates (e.g., filters, range, etc.) for the table. Multiple instances of similar/identical queries can be recorded.

At operation 508 database manager 410 updates the partition keys. In some embodiments, operation 508 is performed by partition manager 411. Operation 508 is discussed in further detail in relation to FIG. 6.

Method 600 can be implemented by one or more processors, host 405, database manager 410, database 430, and/or a different combination of hardware and/or software. In various embodiments, the various operations of method 600 are performed by one or more of host 405, database manager 410, and/or database 430. For illustrative purposes, the method 600 will be described as being performed by partition manager 411.

At operation 602, partition manager 411 identifies a target table. In some embodiments, two or more target tables are identified. A target table can be any table in database 430 that included in a query. In some embodiments, the target table or table may be identified based on data stored in database statistics 418. In some embodiments, the table is identified in response to being included the query received in operation 602.

In some embodiments, the target table is identified based on a change in the size of the table. The change can be a number of entries added/removed from the table. The target table can be identified based on time. For example, a time since the table was previously identified, or a time since the partition keys were set/updated, or based on a routine time (e.g., monthly, weekly, etc.). In some embodiments, the table is identified based on usage. For example, the table may be identified after a predefined number of queries access the table, or a number of the same/similar queries.

At operation 604, partition manager 411 determines a set of common queries associated with the target table. Each query in the set of queries can include one or more instances of the query being executed by database 430. The data relating to the number of time each query has been processes is stored in database statistics 418. In some embodiments, a query can be a common query after a single instance. In some embodiments, a query can be a common query if the number of instances for the query exceeds a minimum threshold. The threshold can be an absolute (e.g., 10 queries), a rate (e.g., 10 queries/week), and/or a percentage of queries that target the table (e.g., greater than 5% of the total number of queries. The thresholds can be adjusted by a user. In some embodiments, all queries that target the table are ranked based on the number of instances. The common queries may be based on the ranking (e.g., the four highest ranked queries).

At operation 606, partition manager 411 identifies core ranges. In some embodiments, the core ranges are based on the common queries. In some embodiments, the core ranges are based the range of the common queries. Consider example 1 for a ranged partitioned table where four common queries have been identified. Each query is based on value of column 1 (C1) of a table 1 (TB1). FIGS. 7A and 7B are used to further explain the example. FIG. 7A shows the four queries with some relevant data. Column 702 is the query number. Column 704 shows the range for each respective query where L is the lowest value and L is less than A, which is less than B, and so on until H, which is the highest value in TB1. Colum 706 shows a frequency of each query per week. Column 708 shows the average time used to process the query in minutes. Column 710 shows a weight for the query. The weight represents a relative importance of the query relative to the other common queries. The weights in column 710 are calculated based on the frequency of each query compared to the total number of the common queries. However, in various embodiments, the weight can be calculated using one or more of frequency, processing time, range, and/or other similar factors. Column 710 does not limit methods of determining the weight of the query.

Each of the common queries have a range of data they will seek. However, these ranges can overlap. The core ranges can be, in order, smaller ranges from the start point of each range to the next start of the next range. One embodiment of identifying core ranges is displayed in FIG. 7B. Column 712 shows the core range number. Column 714 and column 716 show the low value for each core range and the high value of each core range respectively. Each of these columns includes sub-columns with the weight and a direction. The direction indicates a preferred direction to adjust ranges. The preferred adjustment is configured to keep the query ranges in the smallest number of partitions. Moving boundaries, the non-preferred direction, could result in an increase in the number of partitions. Column 718 shows the number of records in each core range.

In some embodiments, the core ranges include a value list. For example, in a list partition, each value that defines the partition can act as a core range. In some embodiments, the value list is organized consistent with FIG. 7A, except the Range is replaced with Value and there is not high/low designation. For example, a first query can have a value list of A, B, and C, and a second query a value range of B, D, and E. The values are not compared relative to each other, but rather based on the specific value of C1.

At operation 608, partition manager 411 merges core ranges into partitions. In some embodiments, the ranges are merged such that each partition boundary aligns with the core range boundary. In some embodiments, each partition size has a minimum number or records and does not exceed a maximum. The minimum and maximum partition size (partition size limit) may be predefined and/or altered. In some embodiments, the partition size limits are set manually (e.g., a user/customer picks a size) In some embodiments, the partition size limits can be based on previous partition keys, the size of the table, the number of common queries, and/or other similar factors. In some embodiments, the partition size limit can be a percentage change. For example, if the limit is 10% increase, and each partition has 100 entries, the new maximum size would be 110 entries and the new minimum size would be 90 entries. The partition size limits may be based on the percentage of the entries in the table. For example, the partition limit may be defined as at least 5% of the entries and no more than 20% of the entries. Consider the above example, if a maximum partition size is defined at 3000 entries, the core range 8 from FIG. 7B will be separated into at least two separate partitions.

In some embodiments, the merged ranges are based on the weights. For example, referring back to FIG. 7B, assume creating an individual partition for F to G of only 200 entries is less than the minimum required for a partition. That range needs to be added to the partition that includes E to F or G to H. However, that would require to move F right, in its non-preferred direction (according to column 716), or to move G left, its non-preferred direction. In this case F's higher weight of 0.3 would override G's weight of 0.2, and F to G would be moved left creating an E to G partition.

At operation 610, partition manager 411 defines updated partition keys or updates the partition keys. In some embodiments, the updated partition keys are based on the results of operation 608. In some embodiments, there is an overall increase in the number of partitions, or a new number of partitions exceeds an original number of partitions. In some embodiments, the updated partition keys are considered logical partition keys. The logical partition keys can be based on the core ranges.

In some embodiments, operation 610 includes mapping the logical partitions into the original physical partition ranges. This way, database manager 410 does not need to alter the manner in which it handles queries. The additional information can be utilized when the query accesses the target table. In some embodiments, the mapping includes dividing each logical partition into one or more blocks. The block size can be based on a combination of the logical partition size and the original partition size. In some embodiments, the blocks are configured such that the final physical partitions contain the same number of entries as the original partitions, which means there is an equivalent number of partitions. Continuing the above example, the sum of all records from column 718 is 1500. Assuming eight original partitions, each partition start with 1875 entries FIG. 7C is one visual representation of how blocks may be configured. Column 722 shows physical partition number. Column 724 shows each core range and how the records are blocked into each physical partition. Each number in FIG. 7C represents a single block. Physical partition 1 includes 2 blocks. The first block is equivalent to the physical partition (row 1 of column 072) would include 1000 entries from L to A, and the second block includes 875 of the entries between A and B. The sixth physical partition would include three blocks, the first block would include 325 of the entries from E to F, the second block all 300 entries of F to G, and the third block 1250 of the entries from G to H. The seventh partition would include a single block.

Method 600 reduces the number of records that need to be scanned to complete a query. Each query can be limited to scanning the core ranges and/or updated logical partitions or the relevant blocks based on the common queries. This increases the overall efficiency of the database system. It also reduces reads specifically on highly weighted (either high process time and/or high frequency) queries. By reducing the time necessary to complete the highly weighted queries, a net benefit is realized by the computing system.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for adjust partition keys comprising:
   identifying a target table that is a target of a query, the target table including a set of initial partitions;
   determining a set of common queries, wherein each query in the set of common queries is processed by a database, each query in the set of the common queries is configured to retrieve data from the target table, each query of the common queries includes a range for a target column the range having two endpoints, the two endpoints being a low value and a high value, and a number of times each query in the set of common queries is processed by a database exceeds a minimum threshold;
   identifying a plurality of core ranges for each query in the set of common queries wherein the core ranges are based on the low value and high value of each query;
   merging the core ranges into a new set of partitions; and
   setting, in response to the merging, updated partition keys to mark the new set of partitions and each updated partition key is aligned with at least one endpoint of the two endpoints.

2. The method of claim 1, wherein each common query includes a weight based on the number of times each query is processed by the database.

3. The method of claim 2, wherein the merging is based on the weight of each common query.

4. The method of claim 1, wherein at least one of the new set of partitions includes a different number of entries than the number of entries in the initial set of partitions.

5. The method of claim 4, wherein a number of entries in each new partition of the new set of partitions is greater than a low entry threshold, and less than a high entry threshold.

6. The method of claim 3 further comprising:
   dividing each of the plurality of core ranges into one or more blocks, wherein each of the one or more blocks includes at least one core range; and
   mapping the one or more blocks to a set of physical partitions.

7. The method of claim 6, wherein the set of physical partitions is equivalent to the set of initial partitions.

8. The method of claim 1, wherein the set of initial partitions is a range partition.

9. The method of claim 1, wherein the set of initial partitions is a list partition.

10. The method of claim 1, wherein the minimum threshold is a rate of processing each query.

11. The method of claim 1, wherein the minimum threshold is based on a ranking of each query that accesses the target table.

12. The method of claim 6, wherein the mapping of the one or more blocks to the physical partition is based on the weight of each query.

13. The method of claim 1, wherein identifying the plurality of core ranges further comprises:
   identifying a lowest value in the column;
   determining a lowest endpoint from the two endpoints from common query, wherein the lowest endpoint is higher than the lowest value; and
   defining a first core range by the lowest value and the lowest endpoint.

14. The method of claim 13, wherein identifying the plurality of core ranges further comprises:
   identifying a next lowest endpoint from the two endpoints;
   defining a next core range by the lowest endpoint and the next lowest endpoint;
   identifying a highest value in the column and continuing defining additional core ranges until a last core range includes a highest endpoint and the highest value.

15. A system configured to adjust partition keys comprising:
   a processor; and
   a computer-readable storage medium communicatively coupled to the processor and storing program instructions which, when executed by the processor, are configured to cause the processor to:
   identify a target table, that is a target of a query, the target table including a set of initial partitions;
   determine a set of common queries, wherein each query in the set of common queries is processed by a database, each query in the set of the common queries is configured to retrieve data from the target table, each query of the common queries includes a range for a target column the range having two endpoints, the two endpoints being a low value and a high value, and a number of times each query in the set of common queries is processed by a database exceeds a minimum threshold;
   identify a plurality of core ranges for each query in the set of common queries, wherein the core ranges are based on the low value and high value of each query;

merge the core ranges into a new set of partitions; and set, in response to the merging, updated partition keys to mark the new set of partitions and each updated partition key is aligned with at least one endpoint of the two endpoints.

16. The system of claim 15, wherein each common query includes a weight based on the number of times each query is processed by the database.

17. The system of claim 16, wherein the merging is based on the weight of each common query.

18. A computer program product, the computer program product comprising a computer readable storage medium having program instructions embodied therewith, the program instructions executable by a processing unit to cause the processing unit to:

identify a target table, that is a target of a query, the target table including a set of initial partitions;

determine a set of common queries, wherein each query in the set of common queries is processed by a database, each query in the set of the common queries is configured to retrieve data from the target table, each query of the common queries includes a range for a target column the range having two endpoints, the two endpoints being a low value and a high value, and a number of times each query in the set of common queries is processed by a database exceeds a minimum threshold;

identify a plurality of core ranges for each query in the set of common queries, wherein the core ranges are based on the low value and high value of each query;

merge the core ranges into a new set of partitions; and set, in response to the merging, updated partition keys to mark the new set of partitions and each updated partition key is aligned with at least one endpoint of the two endpoints.

19. The computer program product of claim 18, wherein each common query includes a weight based on the number of times each query is processed by the database.

20. The computer program product of claim 19, wherein the merging is based on the weight of each common query.

* * * * *